Patented July 4, 1933

1,916,697

UNITED STATES PATENT OFFICE

JOSEF STÖHR, OF WALDSHUT, GERMANY, ASSIGNOR TO THE FIRM OF LONZA-WERKE ELEKTROCHEMISCHE FABRIKEN G. M. B. H., OF WALDSHUT-BADENIA, GERMANY, A CORPORATION OF GERMANY

PROCESS FOR THE PREPARATION OF ALKALINE EARTH ALUMINATES

No Drawing. Application filed November 27, 1931, Serial No. 577,715, and in Germany December 6, 1930.

The present invention relates to improvements in the production of alkaline earth aluminates.

In the preparation of alumina from alkaline earth aluminates it is important to use an alkaline earth aluminate, which is as free as possible from foreign constituents, such as $SiO_2$, $Fe_2O_3$ and the like since on further working up more or less far reaching contaminations of the alumina or the other end products are brought about by such impurities.

The preparation of alkaline earth aluminates was carried out hitherto either by sintering in suitable furnaces e. g. rotary kilns of starting materials containing alumina and alkaline earths with or without a reducing agent e. g. coal, or by melting together the same starting materials with or without reducing agents, e. g. in electric arc furnaces. The impurities of the starting materials are thus reduced to metals and separated as an alloy e. g. ferro-silicon.

In carrying out processes of this type the temperature of the melt does not increase above the melting point of the aluminate to be prepared.

If an electric arc furnace, for example, is fed with a mixture of aluminous material e. g. bauxite, with burnt lime and coal, then there is immediately formed alkaline earth aluminate (calcium aluminate) which is present partly in the solid form on the furnace walls, partly molten, and which prevents the increase of the temperature above the melting point of the aluminate.

These temperatures are however not sufficient for the reduction of the starting materials such as $SiO_2$, $TiO_2$ and $Fe_2O_3$. There is obtained therefore on this account impure and therefore less valuable alkaline earth aluminates.

It has already been proposed to overcome this disadvantage by melting down the aluminous raw material first with a reduction agent in an electric furnace, and converting the product of this reducing and melting process into alkali soluble alkaline earth aluminate in a special stage of the process by melting together with alkaline earth compounds e. g. lime, or baryta.

This method of working has the disadvantage that instead of a single melting process, a two stage process is employed. Moreover, it has been found that by carrying out the process in one and the same furnace the above described disadvantage of the one stage process also makes its appearance.

According to the present invention all these difficulties are overcome by introducing the aluminous starting material e. g. bauxite or other natural or artificial aluminous products or mixtures of the same, into a reducing alkaline earth containing melt, e. g. consisting of calcium carbide and calcium oxide, the composition and amount of which is so measured that the amount of alkaline earth occurring therein suffices for the formation of the alkaline earth aluminate.

Thereby the impurities are first reduced, whereupon the alkaline earth oxide occurring or produced unites with the alumina to alkaline earth aluminate.

The reducing alkaline earth containing melt can be obtained in a first phase of working in the furnace itself. According to the object of use of the alkaline earth aluminate, the material fed to the furnace can be chosen to be richer in alkaline earth or alumina. After the termination of the process the alloy formed and then the alkaline earth aluminate formed is drawn off. After tapping off the alkaline earth aluminate can be disintegrated according to the usual methods.

Example

From 300 kg. of burnt lime and 125 kg. of anthracite there is first obtained a calcium carbide with about 30% $CaC_2$ content. The melt contains about 100 kg. $CaC_2$ and 230 kg. of CaO (melting point about 2200° C.). Into this melt is introduced 900 kg. of dried bauxite of the following composition:—

| | Per cent |
|---|---|
| $SiO_2$ | 10.7 |
| $TiO_2$ | 3.6 |
| $Fe_2O_3$ | 11.3 |
| $Al_2O_3$ | 74.0 |

After complete melting together of the charge, there is first drawn off the FeSiTi alloy, and finally the calcium aluminate. There are obtained about 900 kg. of aluminate and 50 kg. of metal. The composition of the products is the following:—

Alkaline earth aluminate:—

| | Per cent |
|---|---|
| $SiO_2$ | 1.88 |
| $TiO_2$ | 0.24 |
| $Fe_2O_3$ | 0.40 |
| $Al_2O_3$ | 66.56 |
| CaO | 30.92 |

FeSiTi alloy:—

| | Per cent |
|---|---|
| Si | 21.56 |
| Ti | 3.14 |
| Fe | 75.30 |

How great the technical advantages obtained by working according to the above process are, may be seen from a comparison of the above named products with those obtained by known methods. If for example bauxite of the previously mentioned composition is melted down in an electric furnace according to the known process with lime and coal, the alkaline earth aluminate obtained in this manner has the following composition:—

| | Per cent |
|---|---|
| $SiO_2$ | 7.15 |
| $TiO_2$ | 2.39 |
| $Fe_2O_3$ | 0.83 |
| $Al_2O_3$ | 52.55 |
| CaO | 37.35 |

If one works according to the other previously described known process in that a 96% alumina is first prepared by melting together bauxite of the above-named composition with coal, and there is added then to this amount of lime necessary for the formation of the aluminate, there is obtained a product of the following composition:—

| | Per cent |
|---|---|
| $SiO_2$ | 7.74 |
| $TiO_2$ | 1.00 |
| $Fe_2O_3$ | 0.51 |
| $Al_2O_3$ | 57.48 |
| CaO | 33.42 |

If one compares the analysis of these products obtained according to the known process with the alkaline earth aluminate obtained according to the invention, the technical superiority of the present process, which consists in the obtainment of specially pure alkaline earth aluminates of high value which are characterized by a high content of aluminium oxide and only traces of impurities, is exposed.

I declare that what I claim is:—

1. Process of preparing calcium aluminate comprising preparing a melt consisting of calcium carbide and calcium oxide at an excessively high temperature, introducing into the said melt an aluminous material, drawing off the metal alloy formed by reduction of the impurities of said aluminous compound, subsequently drawing off the molten aluminate and disintegrating same.

2. Process of preparing calcium aluminate comprising heating together to a high temperature carbon and excess of lime, to produce a melt at an excessively high temperature, introducing into said melt an aluminous material, drawing off the metal alloy formed by reduction of the impurities of said aluminous compound, subsequently drawing off the molten aluminate and disintegrating same.

3. The process of preparing alkaline earth aluminates which comprises establishing a molten bath containing calcium carbide at an excessively high temperature, introducing an aluminous material into said molten bath having an excessively high temperature, maintaining said bath in a molten condition at said excessively high temperature to produce a molten alkaline earth aluminate and a molten alloy containing iron, silicon and titanium, permitting said molten mass to stratify whereby a relatively pure alkaline earth aluminate floats in the upper part of said bath and the molten alloy containing the impurities sinks to the bottom of said bath.

4. The process of preparing alkaline earth aluminates which comprises establishing a molten bath containing calcium carbide and lime at an excessively high temperature, introducing an aluminous material into said molten bath having an excessively high temperature, maintaining said bath in a molten condition at said excessively high temperature to produce a molten alkaline earth aluminate and a molten alloy containing iron, silicon and titanium, permitting said molten mass to stratify whereby a relatively pure alkaline earth aluminate floats in the upper part of said bath and the molten alloy containing the impurities sinks to the bottom of said bath, and tapping said alloy containing impurities and iron, silicon and titanium from the said relatively pure alkaline earth aluminate.

5. The process of preparing alkaline earth aluminates which comprises establishing a molten bath containing calcium carbide and lime at an excessively high temperature, introducing an aluminous material into said molten bath having an excessively high temperature, maintaining said bath in a molten condition at said excessively high temperature to produce a molten alkaline earth aluminate and a molten alloy containing iron, silicon and titanium, permitting said molten mass to stratify whereby a relatively pure alkaline earth aluminate floats in the upper part of said bath and the molten alloy containing the impurities sinks to the bottom of said bath, and tapping said alloy containing impurities and iron, silicon and titanium from the said relatively pure alkaline earth aluminate, and disintegrating the alkaline earth aluminate.

6. The process of preparing alkaline earth aluminates which comprises reacting burnt lime and carbon to produce a molten bath containing calcium carbide and lime at an excessively high temperature, introducing an aluminous material into said molten bath having an excessively high temperature, maintaining said bath in a molten condition at said excessively high temperature to produce a molten alkaline earth aluminate and a molten alloy containing iron, silicon and titanium, permitting said molten mass to stratify whereby a relatively pure alkaline earth aluminate floats in the upper part of said bath and the molten alloy containing the impurities sinks to the bottom of said bath.

7. The process of preparing alkaline earth aluminates which comprises thoroughly mixing about 300 parts of burnt lime with about 125 parts of anthracite, melting said mixture in an electric furnace to establish a molten bath at an excessively high temperature and to cause a reaction producing calcium carbide, introducing into said molten bath at an excessively high temperature about 900 parts of dried bauxite, continuing the application of heat to maintain said bath in a molten condition and to cause a reaction producing calcium aluminate and an alloy containing iron, silicon and titanium, permitting said molten bath to stratify whereby the alloy containing iron, silicon, titanium and impurities sinks to the bottom thereof and relatively pure calcium aluminate floats to the top thereof, and tapping said alloy from said bath whereby relatively pure calcium aluminate is produced.

In witness whereof, I have hereunto signed my name this 9th day of November, 1931.

JOSEF STÖHR.